J. COMPO.
EMERGENCY ATTACHMENT FOR MOTOR VEHICLES.
APPLICATION FILED FEB. 8, 1915.
1,201,261.
Patented Oct. 17, 1916.
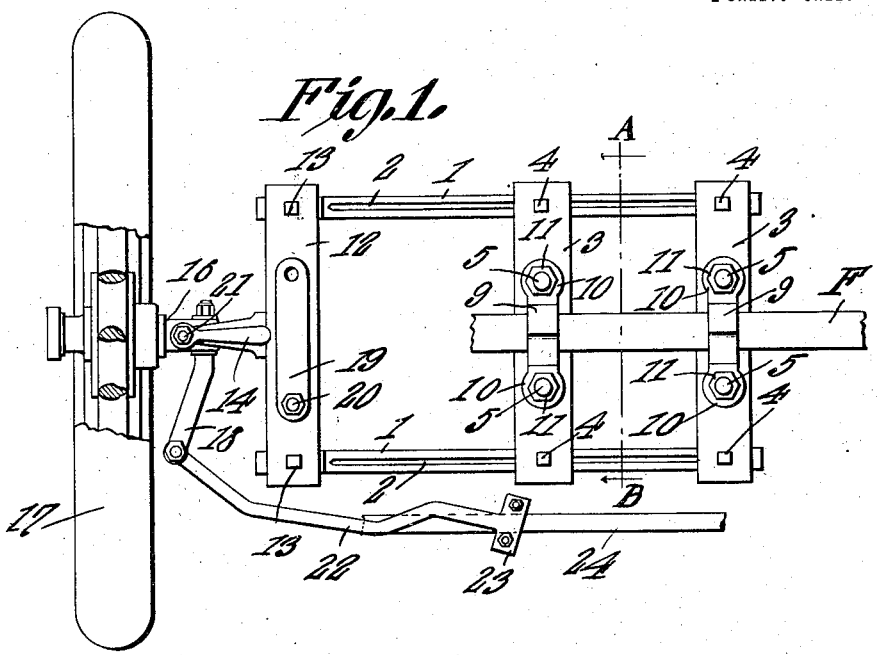
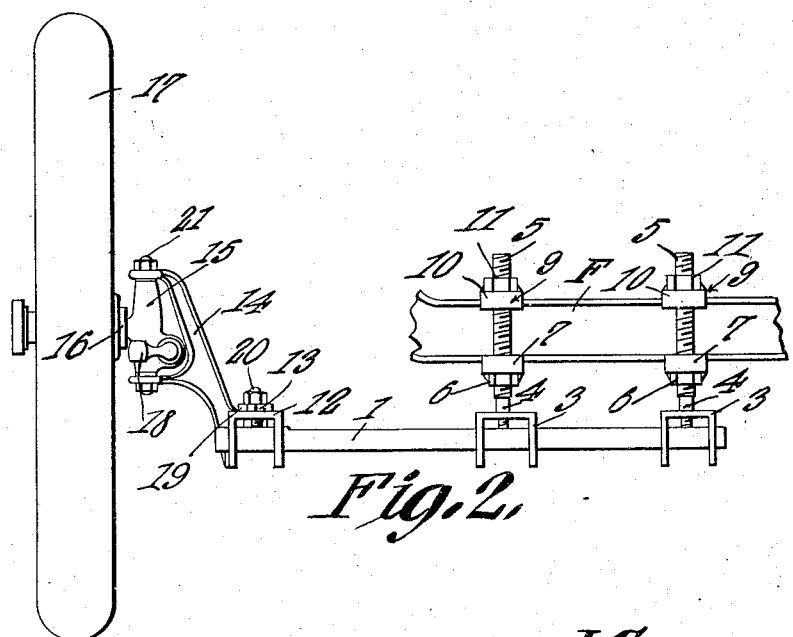
J. Compo, Inventor J. COMPO.
EMERGENCY ATTACHMENT FOR MOTOR VEHICLES.
APPLICATION FILED FEB. 8, 1915.
1,201,261.
Patented Oct. 17, 1916.
2 SHEETS—SHEET 2.
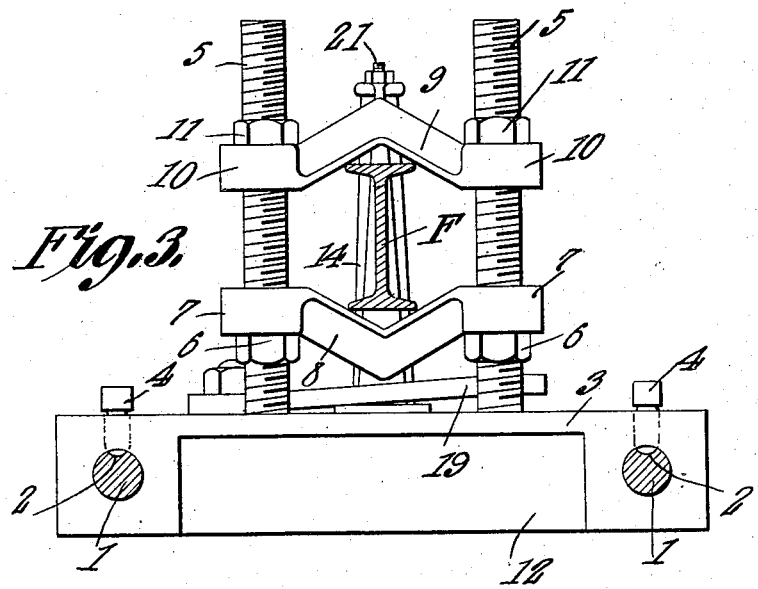
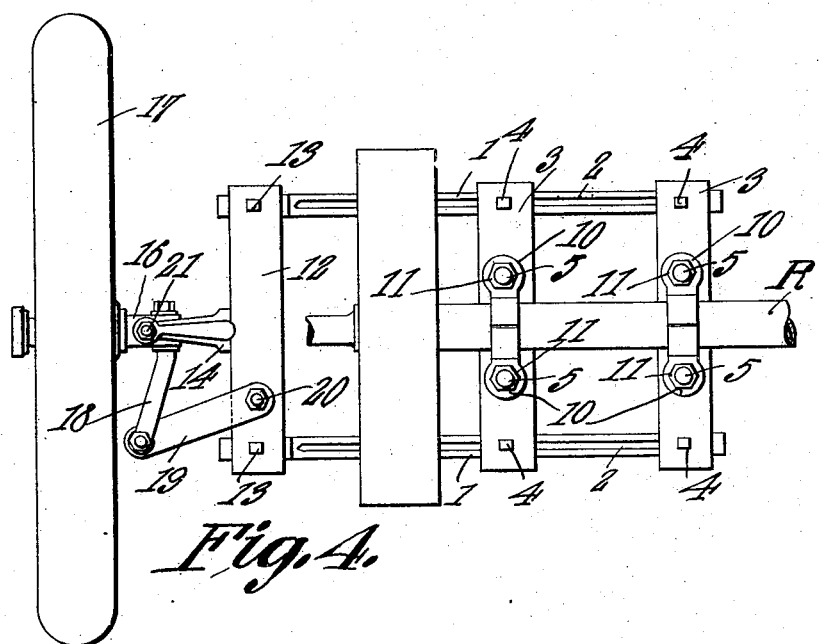
J. Compo, Inventor
Witnesses
by *Attorneys*

UNITED STATES PATENT OFFICE.

JOHN COMPO, OF DEFIANCE, OHIO, ASSIGNOR TO COMPO GARAGE COMPANY, OF DEFIANCE, OHIO.

EMERGENCY ATTACHMENT FOR MOTOR-VEHICLES.

1,201,261.   Specification of Letters Patent.   Patented Oct. 17, 1916.

Application filed February 8, 1915. Serial No. 6,811.

*To all whom it may concern:*

Be it known that I, JOHN COMPO, a citizen of the United States, residing at Defiance, in the county of Defiance and State of Ohio, have invented a new and useful Emergency Attachment for Motor-Vehicles, of which the following is a specification.

This invention relates to an emergency attachment for motor vehicles, its object being to provide a supplemental wheel having means for connecting it to any fixed part of a motor vehicle so that, in the event of the breakage of an axle or wheel, the said supplemental wheel can be applied to the vehicle to enable the said vehicle to continue its travel.

A further object is to provide an attachment of this character the wheel of which can be substituted for either a front wheel or a rear wheel of a vehicle, means being provided whereby, when said wheel is substituted for a front wheel, it can be coupled to the steering mechanism and thus permit the vehicle to be guided as ordinarily.

With the foregoing and other objects in view which will appear as the description proceeds, the invention resides in the combination and arrangement of parts and in the details of construction hereinafter described and claimed, it being understood that changes in the precise embodiment of the invention herein disclosed, can be made within the scope of what is claimed, without departing from the spirit of the invention.

In the accompanying drawings the preferred form of the invention has been shown.

In said drawings: Figure 1 is a plan view of the attachment used in connection with the front axle of a vehicle, a portion of said axle being shown. Fig. 2 is a rear elevation of the structure shown in Fig. 1, the steering mechanism being removed. Fig. 3 is an enlarged section on line A—B Fig. 1. Fig. 4 is a plan view of the attachment applied to the rear axle of a vehicle, a portion of said axle being shown.

Referring to the figures by characters of reference 1 designates parallel rods each of which has a keyway 2 extending longitudinally therein, these rods extending through cross bars 3 provided with set screws 4 designed to project into the keyways and thus hold the bars fixed relative to the rods.

Upstanding from each of the bars 3 are threaded posts 5 and each post is provided with a supporting nut 6. Bearing downwardly on these nuts 6 are eyes 7 formed at the ends of a clamping bar 8 the intermediate portion of which is preferably depressed into V-shape as shown particularly in Fig. 3. Another like clamping bar 9 is arranged above each bar 8 but is disposed oppositely thereto, this bar 9 being also provided with terminal eyes 10 slidably mounted on the posts 5 and engaging the lower faces of clamping nuts 11 which engage the posts. As the bars 3 are adjustably mounted on the rods 1, it will be seen that they can be arranged any desired distance apart and at any desired positions on the rods, thus to adapt the clamping members 8 and 9 for use upon different parts of a vehicle. As shown in Figs. 1, 2 and 3, these bars 8 and 9 engage a broken front axle F.

Detachably secured on the rods 1 is a bar 12 having set screws 13 or the like for engaging the rods 1. This bar 12 is provided with an outstanding knuckle member 14 which can be formed integral with or secured to the bar, said knuckle member engaging the head 15 formed at the inner end of a spindle 16 on which a wheel 17 is mounted for rotation. An arm 18 extends from the head 15 as ordinarily for connection with the steering mechanism. A tie link 19 is pivotally connected to one end portion of the bar 12, as shown at 20 and is for the purpose hereinafter set forth.

It is to be understood that the head 15 can be readily disconnected from the knuckle member 14 by removing the pivot bolt 21 extending therethrough. With the parts thus disconnected, the wheel 17 and the other portions of the emergency attachment can be easily stored in a small space thus rendering the device of especial convenience in that it can be easily carried in a motor vehicle.

When it is desired, for example, to use the emergency attachment upon a broken front axle F, the clamping bars 8 and 9 are placed below and above the axle respectively and tightened so as to bind on the axle. The rods 1 are adjusted longitudinally within the bars 3 to bring the bar 12 at the proper point, after which a rod 22, which forms a part of the attachment, is pivotally connected to arm 18. This rod is preferably provided with a clamp 23 of any suitable form designed to be placed in fixed engagement with the steering rod 24 so that it will be seen that when the parts are thus assembled, the wheel 17 can be controlled by the ordinary steering mechanism.

Should it be desired to apply the attachment to a rear axle R, as in the event of the breakage of the axle or one of the wheels thereon, the attachment is adjusted to properly engage said axle, after which the link 19 is swung about its pivot 20 and attached to the arm 18 as shown in Fig. 4. Thus the wheel 17 will be held against movement about the pivot bolt 21 and will operate as an ordinary rear wheel. Obviously instead of attaching the structure to one of the axles of a vehicle, it could be applied equally as well to a portion of the chassis, to a spring or any other part of the vehicle which is sufficiently rigid.

The device herein described is especially desirable in the transportation of a disabled truck, cart, wagon, gun carriage or any other kind of vehicle, as well as an automobile.

What is claimed is:—

1. An emergency attachment for vehicles, including spaced members, connections therebetween, means upon one of the connections for engaging a portion of the vehicle, a steering knuckle carried by another connection and including a spindle, a wheel mounted for rotation on the spindle, an arm movable with the spindle, and means engaging the arm for holding the spindle in a predetermined position relative to the vehicle.

2. An emergency attachment for vehicles, including spaced rods, a bar connecting said rods and adjustably mounted thereon, means adjustably mounted on the bar for securing the attachment rigidly to a portion of a vehicle, a second bar supported by the rods, a steering knuckle extending from said bar and having a spindle, a wheel mounted for rotation on the spindle, and means for holding the spindle in a predetermined position relative to the knuckle carrying bar.

3. An emergency attachment for vehicles, including parallel rods, a bar adjustably mounted on the rods and constituting a connection therebetween, threaded posts upstanding from the bar, clamping members adjustably mounted on the posts for holding the attachment rigidly to a vehicle, a second bar connecting the rods, a steering knuckle extending therefrom and having a spindle mounted to swing, a wheel mounted for rotation on the spindle, and means for holding the spindle in a predetermined position relative to the knuckle carrying bar.

In testimony that I claim the foregoing as my own, I have hereto affixed my signature in the presence of two witnesses.

JOHN COMPO.

Witnesses:
HENRY B. HARRIS,
E. RICHOLT.